Feb. 20, 1940. E. L. WOOD 2,190,965
FILTER
Filed Nov. 22, 1938
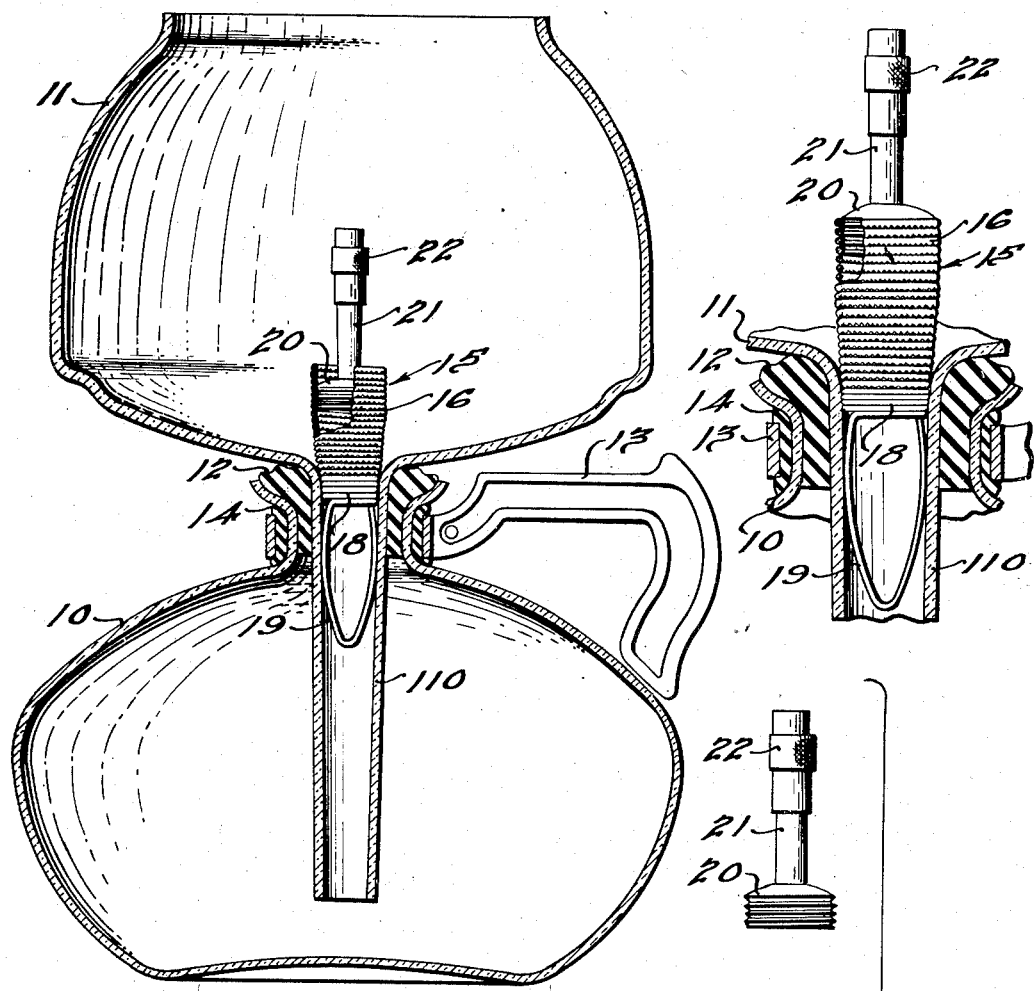
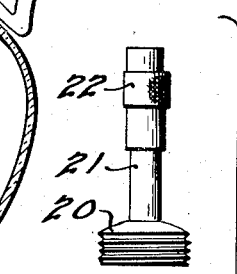
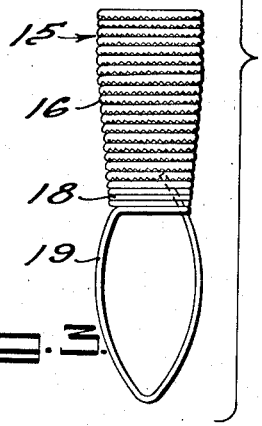
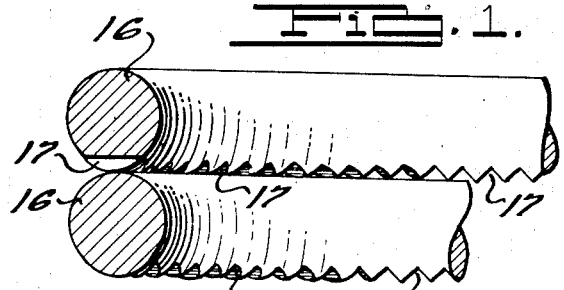
INVENTOR
Edward L. Wood.
BY Everett G. Wright
ATTORNEY Patented Feb. 20, 1940

2,190,965

UNITED STATES PATENT OFFICE 2,190,965

FILTER

Edward L. Wood, Detroit, Mich.

Application November 22, 1938, Serial No. 241,744

5 Claims. (Cl. 210—162)

This invention relates to filters and in particular to filters constructed in the form of a helical spring which may be applied to coffee makers and elsewhere where a readily cleanable, sanitary or long lived filter is desired or required.

The invention will be herein described in its novel combination with and adaption to coffee makers of the pressure-vacuum type in which upper and lower receptacles are employed arranged to permit water from the lower receptacle to be forced by pressure into the upper receptacle where liquid coffee is formed by infusion when coming in contact with finely ground coffee disposed in the upper receptacle from whence the said liquid coffee is drawn by vacuum through a filter into the lower receptacle.

Cloth filters generally employed in coffee makers usually leak around the lower outer periphery thereof which contacts the bottom of the upper receptacle of the coffee maker thereby often permitting finely ground coffee to pass from the upper receptacle of the coffee maker into the bottom receptacle thereof with the liquid coffee during the passage of the liquid coffee from the upper receptacle to the lower receptacle. Cloth filters are hard to clean and become unsanitary and unsightly after being used but a comparatively few times.

Glass filters have also been provided for coffee makers in the form of a glass ball or the like having a roughened surface, however, such filters have proven unsatisfactory because of breakage and because of the danger from fine particles of glass which may chip therefrom and accidentally drop into liquid coffee filtered into the bottom of a coffee maker equipped therewith.

One object of the invention is to provide a filter constructed in the form of a helical spring from coiled spring wire having transversely disposed deformations spaced along at least one side thereof which become juxtaposed to the adjacent convolution of the helix formed when the said wire is coiled into the form of a helical spring whereby to provide minute interstices through the completed helical spring.

Another object of the invention is to provide a filter constructed in the form of a coil spring having interstices formed in the periphery of the said filter by notching at least one of the juxtaposed faces of the wire forming the said spring.

Another object of the invention is to provide a filter for coffee makers which will serve as valve means to permit water to pass from the lower receptacle to the upper receptacle of the said coffee maker through the depending funnel of the said upper receptacle under pressure created by steam formed in the lower receptacle and then serve as a strainer for liquid coffee formed by infusion in the upper receptacle when the said liquid coffee is returned into the lower receptacle by vacuum formed in the said lower receptacle.

Another object of the invention is to provide a filter for coffee makers and the like constructed in the form of a helical spring which may be easily and readily cleaned by extending the convolutions thereof and placing the said filter under running water.

Another object of the invention is to provide the coiled spring type filter for coffee percolators and the like having a closure for the top thereof adapted to be threaded into the top of the said filter any desired distance whereby to provide more or less filter area as may be required to regulate the rapidity with which liquid coffee in the top receptacle of a coffee maker is permitted to pass under vacuum into the lower receptacle thereof.

Other objects of the invention will become apparent by reference to the following detailed description taken in connection with the accompanying drawing, in which:

Fig. 1 is a vertical sectional view of a coffee maker equipped with an embodiment of the improved filter.

Fig. 2 is an enlarged detailed fragmentary sectional view of the improved filtering element adjusted to provide more filter area than the adjustment thereof shown in Fig. 1.

Fig. 3 is an exploded view of the particular embodiment of the invention disclosed in Figs. 1 and 2.

Fig. 4 is a greatly enlarged fragmentary view part in section and part in elevation showing the preferred formation of filter interstices by the deforming of at least one side of wire from which the filter is formed and the positioning of the said deformed side thereof into juxtaposition with the adjacent convolution of the spring into which the wire is coiled.

Referring now to the drawing wherein like numerals refer to like and corresponding parts throughout the several views, the illustrative embodiment of the invention disclosed is shown in novel combination with respect to a pressure-vacuum type coffee maker which comprises a lower receptacle 10, an upper receptacle 11 having a funnel-like spout 110 integral therewith and depending therefrom which is normally positioned in sealed relationship through the neck of the lower receptacle 10 with a resilient annular washer 12 disposed therebetween to assure a perfect seal between the outside of the said spout 110 of the upper receptacle 11 and the inner periphery of the neck of the said lower receptacle 10. A suitable handle 13 is preferably secured to the lower receptacle 10 around the neck thereof as indicated in Fig. 1 with a washer 14 disposed therebetween.

The novel filter 15 is constructed in the general form of a helical spring preferably made from stainless steel spring wire 16 having generally transversely disposed deformations 17 formed in at least one side thereof which becomes juxtaposed to the smooth side of the adjacent convolution of the helix formed when the said spring wire 16 is coiled into a helical spring whereby to provide a plurality of minute interstices through the periphery of the completed filter as best shown in Figs. 3 and 4. The lower convolutions of the filter 15 are preferably not deformed in the region thereof which contacts the inner periphery of the funnel-like spout 110 of the upper receptacle 11 as indicated by the numeral 18 in Figs. 1 and 2. The lower end of the said filter 15 is provided with an anchorage loop 19 considerably wider than the inside diameter of the funnel-like spout 110 of the upper receptacle 11 to admit of frictional anchorage of the bottom of the filter therein as indicated in Figs. 1 and 2.

The top of the filter is preferably formed cylindrical in shape for about one-third of its height and is tapered for its lower two-thirds of its height at a taper slightly greater than the taper of the inside taper of the funnel-like spout 110 of the upper receptacle 11 to admit of engagement in the top of the said funnel-like spout 110 as shown in Figs. 1 and 2.

An upper seal 20 having an upwardly disposed stem 21 provided with a knurled handle 22 formed thereon is threaded to the same pitch as the pitch to which the spring wire 16 is coiled whereby to admit of turning the said upper seal 20 into the top of the said coiled spring wire 16 as shown in Figs. 1 and 2. The depth to which the upper seal 20 is turned within the coiled spring wire 16 of the filter 15 determines the active area of the filter 15. When relatively slower filtering is desired the upper seal 20 is threaded down further into the top of the filter 15 as shown in Fig. 1. Thus, the length of time the liquid coffee remains in the upper receptacle 11 may be regulated at will by the user of the novel filter 15.

The spring action of the said filter 15 normally maintains the convolutions of the spring wire 16 thereof tightly juxtaposed, however, whenever pressure is created in the lower receptacle 10 by the formation of steam therein, the said pressure forces water from the lower receptacle 10 up into the upper receptacle 11 through the stem 110 thereof which extends the convolutions of the spring wire 16 of the filter 15 and opens up sufficient space between the said convolutions of the spring wire 16 to admit of water passing rapidly through the filter 15 into the upper receptacle 11. Thus, the filter 15 not only functions as a filter but serves as a pressure relief valve through which water under pressure from the lower receptacle 10 is admitted to the upper receptacle 11. The opening up of space between the convolutions of the spring wire 16 of the filter is so slight, the area of contact between the convolutions of the said spring wire 16 is so small and the return action of the convolutions of the said spring wire 16 is so rapid as to substantially eliminate any possibility of finely ground coffee placed in the upper receptacle 11 becoming lodged between the said convolutions of the spring wire 16 of the filter 15 and holding the said spring wire 16 apart.

In using the novel filter disclosed herein in connection with a coffee maker the lower receptacle 10 is filled with water to a suitable level. The upper seal 20 of the filter 15 is threaded in the top thereof to the desired depth to regulate the amount of effective filter area of the filter 15 and control the rapidity with which liquid coffee from the upper receptacle 11 may pass therethrough. The said filter 15 is then inserted into the upper receptacle 11 and the upper receptacle 11 is placed on the lower receptacle 10 with the funnel-like spout 110 of the said upper receptacle 11 positioned in sealed relationship through the neck of the lower receptacle 10 as shown in Fig. 1. The desired amount of finely ground coffee is then placed in the upper receptacle 11 around the filter 15. The coffee maker is then placed on a suitable heating element and the water in the lower receptacle 10 is brought to a boiling point whereupon pressure formed within the lower receptacle 10 forces water therein up through the funnel-like spout 110 of the upper receptacle 11 and through the filter 15 which functions as a valve as hereinbefore described in detail. When substantially all of the water from the lower receptacle 10 has been forced by pressure into the upper receptacle 11, heat is no longer applied to the bottom of the coffee maker and the lower receptacle 10 of the coffee maker is permitted to cool. This cooling creates a vacuum in the lower receptacle 10 which draws liquid coffee which has been formed by infusion in the upper receptacle 11 through the interstices of the active area of the filter 15 and down the funnel-like spout 110 into the lower receptacle 11.

During the passage of the liquid coffee from the upper receptacle into the lower receptacle through the filter 15, the ground coffee is drawn to the active area of the peripheral surface of the filter 15 and forms a filter mat thereon which aids materially in the functioning of the said filter 15. Obviously, the finer the coffee is ground, the more dense the filter mat formed by the ground coffee becomes and, as a result, the filtering becomes more efficient.

When all of the liquid coffee has passed from the upper receptacle 11 into the lower receptacle 10, the upper receptacle 11 may be removed from the top of the lower receptacle 10 and the lower receptacle may be used as a pitcher from which the liquid coffee may be poured.

When cleaning the filter 15, the upper seal 20 thereof is turned nearly out of the upper end of the said filter 15 and the filter 15 is placed under running water, and, at the same time, the convolutions of the spring wire 16 thereof are extended by simultaneously pulling on the upper knurled handle 22 of the upper seal 20 and on the anchorage loop 19 projecting from the lower end of the said filter 15 which permits all ground coffee to be flushed from the interstices of the said filter.

Although but one embodiment of the invention and one application thereof have been disclosed and described in detail herein, it is obvious that many changes and modifications may be made in the size, shape, arrangement and details of the various elements of the invention without departing from the spirit thereof and it is not intended to limit the scope of the invention other than by the terms of the appended claims.

I claim:

1. A filter for a coffee maker comprising a hollow coil of spring wire having at least a portion of conical shape with the convolutions thereof tensioned in substantial abutting relationship to movably engage the funnel-like spout of the coffee maker and form a support for the remainder of the coil, a closure for the large end of the coil, and anchoring means on the small end of the said conical portion.

2. A filter for a coffee maker comprising a hollow coil of spring wire having the convolutions thereof tensioned in substantially abutting relationship and having a portion of cylindrical shape and another portion of conical shape to removably engage the funnel-like spout of the coffee maker and form a suport for the remainder of the coil, a closure supported solely by said cylindrical portion, a projection on said closure by means of which it may be adjusted, and means on the coil to provide an anchor therefor.

3. A combined filter and valve for coffee makers of the character described comprising a helical wire spring in which the convolutions thereof are normally disposed in sufficient tensional contact with each other to make the filter resiliently self-supporting, the said helical spring having interstices formed in the periphery thereof by providing spaced deformations in at least one of the juxtaposed faces of the wire forming the convolutions of the helical spring, means for sealing closed the upper end of the said helical spring, and means for removably anchoring the said combined filter and valve in filtering position plugging the top of the funnel of the upper unit of the coffee maker leaving the upper portion of said combined filter and valve unsupported except by the tension of the helical wire spring per se.

4. A combined filter and valve for coffee makers of the character described comprising a helical wire spring in which the convolutions thereof are normally disposed in sufficient tensional contact with each other to make the filter resiliently self-supporting, the said helical spring having interstices formed in the periphery thereof by providing spaced deformations in at least one of the juxtaposed faces of the wire forming the convolutions of the helical spring, disc means having helical grooves in the periphery thereof for sealing closed the upper end of the said helical wire spring threadable any desired distance into the top thereof whereby to vary its active area as a filter, and means for removably anchoring the said combined filter and valve in filtering position plugging the top of the funnel of the upper unit of the coffee maker leaving the upper portion of said combined filter and valve unsupported except by the tension of the helical wire spring per se.

5. A filter for a coffee maker comprising a hollow coil of spring wire having at least a portion of conical shape with the convolutions thereof tensioned in substantial abutting relationship to removably engage the funnel-like spout of the coffee maker and form a support for the remainder of the coil, the interior of said coil being substantially unobstructed throughout the major portion of its length, a closure for the large end of the coil and anchoring means extending from the small end of the said conical portion.

EDWARD L. WOOD.